I. H. Stoddard.
Photographic Camera.
Nº 99,026. Patented Jan. 18, 1870.
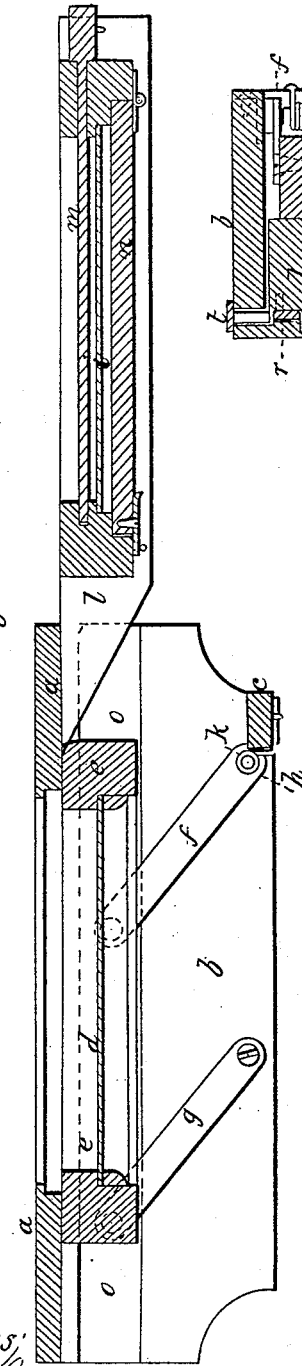
Fig. 1.
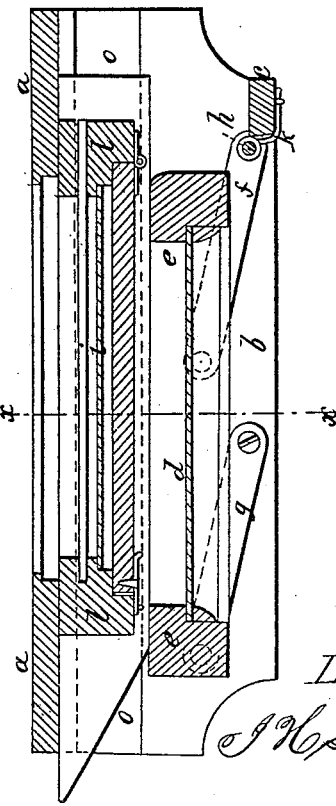
Fig. 3.
Fig. 2.
Witnesses:
Chas H Smith
Geo. D. Walker
Inventor:
I H Stoddard

United States Patent Office.

ISAAC H. STODDARD, OF ANSONIA, CONNECTICUT.

Letters Patent No. 99,026, dated January 18, 1870.

IMPROVEMENT IN PHOTOGRAPHIC CAMERAS.

The Schedule referred to in these Letters Patent and making part of the same.

*To all whom it may concern:*

Be it known that I, ISAAC H. STODDARD, of Ansonia, in the county of New Haven, and State of Connecticut, have invented, made, and applied to use a certain new and useful Improvement in Cameras; and I do hereby declare the following to be a full, clear, and exact description of the said invention, reference being had to the annexed drawing, making part of this specification, wherein—

Figure 1 is a sectional plan of the improvement, showing the ground glass in place for adjusting the focus, and the slide in position to be inserted;

Figure 2 is a sectional plan, with the slide and plate inserted in place, and the ground glass and its frame thereby pushed back; and Figure 3 is a vertical section at the line $x\ x$, fig. 2.

Similar marks of reference denote the same parts.

Heretofore it has been usual to fit camera-boxes with a ground glass, in a frame for adjusting the focus for the picture. This glass and frame have either been removed or slidden aside for the introduction of the plate on which the picture is to be taken.

In cameras fitted as aforesaid, the glass is liable to be broken when being removed or replaced, and the camera-box is left open considerably, and dust gets into the same.

My invention is intended for sustaining the ground glass at the rear of the camera, so that it will be pressed back by the act of inserting the slide containing the plate, and then spring forward to its place, as the slide is withdrawn, so as to keep the camera-box closed and free from dust.

In the drawing—

$a$ represents the frame that is fastened to or forms the rear portion of the camera-box.

The camera-box and lens are not shown, as these may be of any desired character.

From the frame $a$ project the top and bottom ledges $b\ b$, that are united by the vertical bar $c$, to form an open frame.

$d$ is the ground glass in a frame, $e$, that sets freely between the ledges $b\ b$, and is provided with links $f$ and $g$.

I have shown the links $f$ in the form of arms extending from the shaft $h$, the ends being united by screws or pins to the top and bottom of the frame $e$, and the links $g$ are parallel to the links $f$, but they are attached to the ledges $b\ b$ by screws, instead of there being a shaft, $h$.

The glass $d$ and its frame swing toward or away from the end of the camera, on the links $f\ g$, and a spring or springs, $k$, act to press the frame to the camera, and keep it in the position of fig. 1, except when the slide $l$, carrying the plate for the picture, and formed with tapering ends, is forced in between the frame $e$ and the camera or frame $a$.

The slide $l$ is made with any usual holder for the plate $i$, and with the cover or slide $m$, and swinging back $n$.

I prefer to use a gutter at $o$, in the lower ledge $b$, for catching any droppings of nitrate of silver, or other liquid employed to sensitize the plate.

Upon the upper part of the frame or slide $l$, I affix a bar, $r$, that runs along upon a bar, $s$, that is affixed to the frame $a$, so as to suspend the slide $l$ as it is introduced, and I employ a spring, $t$, with a pin having a double-bevelled end, that springs into a notch or notches, to indicate when the slide has been pushed into the proper point.

By connecting the frame $e$, carrying the glass, to the frame $b$, by means of the links $f$ and $g$, there is but little friction to be overcome when said frame is pushed back by the slide $l$, because the links simply turn at their points of attachment; whereas, in the slides heretofore constructed, the frame for the glass is liable to jam, or the springs or guide-pins to hinder the free movement of the parts.

Besides this, my improvement prevents the slide $l$ from becoming obstructed in its movement, because the bars $r\ s$ suspend it so that the lower edge is free from contact with the frame $b$, at the lower side, where the nitrate of silver frequently drops and obstructs the motion of the slide $l$.

What I claim, and desire to secure by Letters Patent, is—

1. The arrangement of the links $f$ and $g$ and shaft $h$, in combination with the frame $e$, carrying the glass $d$ and the slide $l$, substantially as and for the purposes specified.

2. The bar $r$, upon the slide $l$, and the bar $s$ on the frame $a$, for suspending the slide $l$, as it is moved into place, as set forth.

In witness whereof, I have hereunto set my signature, this 12th day of January, A. D. 1869.

I. H. STODDARD.

Witnesses:
GEO. T. PINCKNEY,
CHAS. H. SMITH.